Patented June 1, 1937

2,082,006

UNITED STATES PATENT OFFICE 2,082,006

PROCESS FOR REMOVING AND RECOVERING SULPHUR DIOXIDE FROM WASTE GASES

Henry F. Johnstone, Urbana, Ill., assignor to Board of Trustees of the University of Illinois, Urbana, Ill., a corporation of Illinois

REISSUED NOV 2 6 1940

No Drawing. Application April 10, 1933, Serial No. 665,337

18 Claims. (Cl. 23—178)

This invention relates to a process for removing and recovering sulphur dioxide from waste gases, and is more particularly directed to the recovery of sulphur dioxide from flue gases and industrial plant gases, although its use is not limited to such gases, since it is equally applicable for use in connection with smelter gases and the like.

This gas has become one of the most obnoxious and undesirable constitutents of waste gases. It constitutes an acute health menace on account of its pollution of the atmosphere in communities adjacent industrial centers. Further, when released into the atmosphere, it combines with the vapor of the atmosphere to form destructive acids which are injurious to adjoining properties. Further, the commercial use of sulphur has threatened exhaustion of the world's sulphur supply and, inasmuch as the largest part of the industrial use of sulphur passes through the oxidation stage represented by the dioxide, the removal and recovery of the dioxide from waste gases and the like in industrial localities is economically advantageous.

In the practice of the present invention I have been able to produce pure sulphur dioxide gas from waste gases having, by volume, as low as 0.05% of this constituent present. The pure gaseous product can be condensed by the usual procedure of cooling and compressing. The new process is especially useful, therefore, in recovering sulphur dioxide from gases having a low percentage of this constituent present, such as gases resulting from the combustion of coal, oil, or other sulphur bearing fuels, and waste industrial gases containing sulphur dioxide, although the gas may also be removed and recovered from smelter fumes and the like.

In considering the problem of removing sulphur dioxide from gases, four general systems have been employed. Firstly, and probably of greatest use, is the washing of the gases containing sulphur dioxide with water, or with water containing an alkaline reagent or other solvent, to recover the sulphur dioxide. A second system, brought out in detail in my copending application, Serial No. 500,684, filed December 8, 1930 now Patent 2,021,906, is directed to the oxidation of sulphur dioxide in water to sulphuric acid, which then may be removed as desired. A third method comprises the chemical reduction of the sulphur dioxide to free sulphur. As a fourth expedient, various mechanical means have been attempted in order to remove and recover the sulphur dioxide from such gases, such as adsorption on a porous material, or by compression of the gases, or refrigeration. At the present time, however, none of these processes appears to have solved the problem adequately, since in large scale operation the cost of using such processes is far greater than the value of the by-product recovered.

The present invention, in its preferred embodiment, is directed to a process comprising the absorption, at a low temperature, with respect to the process of sulphur dioxide by an aqueous solution containing the salt of an acid having ionizing characteristics such that its ionization either decreases less than that of sulphurous acid with increasing temperatures or, preferably, its ionization increases with increasing temperatures. While it is the salt of the acid which is used, the references to ionization constant in the specification and claims of the present application refer to the ionization constant of the acid. The absorbed sulphur dioxide is then released from the solution by increasing the temperature, which causes a change in the ratio of the ionization constant of the sulphurous acid formed in the solution as compared to that of the other acid. The sulphur dioxide may then be separated from water vapor and other impurities in any desired manner.

In carrying out the above process I preferably first wash the waste gases, coming either from the flue or other source, with a spray of cooled water, removing some dust and sulphur trioxide from the gases. The gases are then introduced into a suitable washer or scrubber, where they are subjected to a counter-current flow of the aqueous solution containing the salt of the acid having the ionizing characteristics as pointed out above. The saturated solution, that is, the solution which has become saturated with respect to the incoming gases, is collected by any suitable means at the lower portion of the washing or scrubbing tower, and is then passed through a suitable heat exchanger disposed in the path of the regenerated solution being conducted to the washer. The regenerated solution is thus cooled, its heat being absorbed by the saturated solution passing through the regenerator. The principle of operation of such heat exchanger is old, and need not be described in detail.

In the regenerator, which may be of any desired type, the saturated solution is boiled either at atmospheric pressure, pressures greater than atmospheric or under a vacuum, depending upon the temperature of most efficient liberation of the sulphur dioxide. In the present embodiment of the invention, this temperature is normally from 70° to 90° C. The water vapor which may be present in the liberated sulphur dioxide is condensed, and the gas then passes through suitable driers and purifiers to a compressor, where it is condensed and compressed into cylinders, ready for shipment. The regenerated solution, with the sulphur dioxide removed therefrom, passes from the regenerator through the heat interchanger to a suitable cooler, and from the cooler is again delivered into the washing or scrubbing tower to again absorb sulphur dioxide from the incoming gases.

I am aware of the process employed in the German Patent No. 553,910, issued June 16, 1932, to Gumlich and Richter, which, in some of its broader aspects, is related to the process disclosed in the present invention. However, the present process distinguishes from this patent in several major respects, to be hereinafter disclosed.

The use of salts of which the corresponding acids have a degree of ionization which either increases with increase in temperature or decreases to a lesser extent than that of sulphurous acid, provides for a change in the equilibrium existing in the solution, or, in other words, a change in the ratio of the ionization constant of the added acid as compared to that of sulphurous acid. The quantity of sulphur dioxide present in the solution in the form of the bisulphite ion ($HSO_3$) is proportional to the concentration of sulphur dioxide in the waste gases, and varies in accordance with the following ratio:

$$\frac{\text{Ionization constant of sulphurous acid}}{\text{Ionization constant of other acid}}$$

In introducing the sulphur dioxide into the solution the following reaction takes place:

$$SO_2(\text{dissolved}) + H_2O \rightarrow H_2SO_3$$

This, upon ionization, results in the following equation:

$$H_2SO_3 \rightarrow H^+ + HSO_3^-$$

As above pointed out, the quantity of the bisulphite ion present in the solution is proportional to the quantity of $SO_2$ present in the gas and varies in accordance with the ionization ratio as shown above. It is apparent that in order to absorb sulphur dioxide into the solution at low temperatures and drive it off at higher temperatures, the ionization constant of the sulphurous acid formed at the low temperatures must decrease in comparison with the ionization constant of the added acid, so that the sulphur dioxide will be driven off at higher temperatures, since the sulphur dioxide present is proportional to this ratio. Therefore, the greater the change in equilibrium that can be effected by the increase of temperature, the greater will this ratio be decreased, and the more sulphur dioxide will be given off at the higher temperature.

Thus it is obvious that the use of the salt of an acid whose ionization constant increases with increasing temperatures will provide for a greater operating capacity of the solution. I have found that sulphanilic acid ($HC_6H_6NSO_3$), has such characteristics. For example, at 25° C. it has an ionization constant of approximately 5.5—6.0×10$^{-4}$. When the temperature is increased to 65° C., the ionization constant increases to approximately 12.1—13.4×10$^{-4}$. On the other hand, comparing this to the ionization constant of sulphurous acid, which is 170×10$^{-4}$ at 25° C., and which decreases, upon increase of temperature, to 20×10$^{-4}$ at 80° C., it is apparent that the ionization constant of sulphanilic acid increases upon decrease of the ionization constant of sulphurous acid. It is therefore apparent that salts of this acid meet the characteristics required. Naphthionic acid has an ionization constant of 21.2×10$^{-4}$ at 25° C., and increases to 44.2×10$^{-4}$ upon heating. The salts of this acid, therefore, also fill the requirements desired for use in the solution.

Other acids which have increasing ionization with increasing temperatures include metanilic and citric. There are others which have this characteristic in a lesser degree. Certain other acids may be included, among them being the acids which have an ionization constant that is independent of temperature change over the range of temperatures employed, or which have only a slight decrease in ionization in this temperature range. In summary, with the use of a salt of an acid such as that of sulphanilic acid, the reaction produced in the solution by the absorption of sulphur dioxide thereinto is substantially as follows:

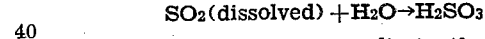

(sulphur dioxide)   (water)   (sulphanilate ion)

(sulphanilic acid)   (bisulphite ion)

It is apparent that the sulphur dioxide is held in the solution in accordance with the ratio between the ionization constant of sulphurous acid and that of the sulphanilic acid. Upon heating this ratio decreases, due to the increase in the ionization constant of the sulphurous acid. This means that less of the sulphur dioxide can be held in the solution as the bisulphite ion, and it is therefore liberated. Further, since salts in general are practically completely ionized, it makes little difference which salt of the acid is employed. In other words, ammonium sulphanilate ($NH_4C_6H_6NSO_3$) fulfills the requirements as well as the other salts of sulphanilic acid.

A further characteristic which the added salts of acids should possess in order to maintain the operating capacity of the solution as high as possible is that the corresponding acid have an ionization constant which, at the low temperature, provides for the presence of a portion of the acid in an unionized condition when the solution is saturated with $SO_2$, and is substantially of the same order of magnitude as that of sulphurous acid at the same temperature.

Further, in the case of many of the acids having the characteristics as set forth in connection with sulphanilic acid, an additional advantage is secured in that, because of their low solubility at low temperature, that is, in the present invention, at temperatures from approximately 30° to 40° C., at which the washing process is normally carried on, the acid is removed from the solution and thus from the zone of influence, allowing more of the sulphur dioxide to form the bisulphite ion ($HSO_3^-$). This removal of the acid from the zone of influence of the solution is of practical value in dealing with gases having a low sulphur dioxide content, such as flue gases and waste gases from industrial plants, where it is of prime importance to get enough sulphur dioxide into the solution to make the recovery thereof feasible. This problem does not have to be considered in connection with gases having a higher sulphur dioxide content, such as smelter gases and the like.

From a chemical standpoint, the removal of the acid from the solution permits the reaction to go further in the direction desired, and thus gives the solution a greater capacity. However, in general, as in the case of salts of sulphanilic acid, the free acid will be only slightly soluble in water, and the absorption of sulphur dioxide will cause the acid to separate from its solution. In case the insoluble acid is a solid it will be necessary to handle a sludge with the solution. I have found that the presence of a large concentration of ammonium sulphite causes the acid to form a very fine grain suspension, which settles slowly, whereas, in the absence of this salt, a large grain, crystalline precipitation is formed, which settles faster. The suspension can be handled more readily than the larger grain precipitate.

In order to obtain as high an operating capacity of the solution as possible, I have also found it advisable to add to the aqueous acid solution certain compounds which increase the solubility of the sulphur dioxide at low temperatures. For example, ammonium sulphite $(NH_4)_2SO_3$, greatly increases the solubility of the gas at low temperatures, but at high temperatures the increase in solubility due to the presence of this substance in the solution is only slight, and the sulphur dioxide gas may be driven off by heating. As above pointed out, the presence of the ammonium sulphite also produces the fine grain suspension precipitate for the acid, which allows it to be handled in a more efficient manner mechanically. In the presence of an acid such as sulphanilic acid the increased acidity at the higher temperature helps to drive off the sulphur dioxide.

It is to be understood that the ammonium solution may be used either separately or in combination with the sulphanilate. If used together it would probably be better to use the ammonium sulphanilate. However, I have found that ammonium sulphite, by itself, is capable, when in solution, of absorbing sulphur dioxide at low temperatures, and of releasing the absorbed sulphur dioxide at higher temperatures. When such an ammonium solution is used, the ammonia may be added to the solution either as ammonium sulphite, as ammonium hydroxide, or as ammonia gas. In the latter two cases, at normal temperatures, the first sulphur dioxide absorbed neutralizes the hydroxide to form the sulphite or the bisulphite, as indicated in the following reaction:

$$2NH_4OH + SO_2 \rightleftharpoons 2NH_4^+ + SO_3^{--}$$

As more sulphur dioxide enters the solution, the sulphite ion is converted into the bisulphite ion, as follows:

$$(NH_4)_2SO_3 + H_2O + SO_2 \rightleftharpoons 2NH_4 + 2HSO_3^-$$

When the solution is heated after leaving the absorbing tower the reaction is reversed, and the bisulphite is converted into the normal sulphite and sulphur dioxide gas, which can be recovered. The ammonium salt solution thus acts in the same manner as the salts of the acids mentioned above in absorbing sulphur dioxide at low temperatures and releasing it at increased temperatures.

However, it is also within the scope of the present invention to employ ammonium sulphite in connection with the use of a salt of an acid such as sulphanilic acid. In this case ammonium sulphanilate reacts with the sulphur dioxide and water present, as follows:

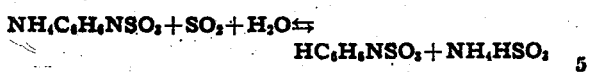
$NH_4C_6H_4NSO_3 + SO_2 + H_2O \rightleftharpoons$
$$HC_6H_4NSO_3 + NH_4HSO_3$$

Upon heating of the solution the sulphur dioxide is released according to the following reaction:

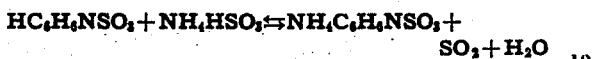
$HC_6H_4NSO_3 + NH_4HSO_3 \rightleftharpoons NH_4C_6H_4NSO_3 +$
$$SO_2 + H_2O$$

It is thus apparent that ammonium sulphite can be used either alone or in combination with one of the added acids, in order to increase the operating capacity of the solution. Further, because of its particular properties, the addition of the ammonium sulphite will not prevent, nor materially retard the liberation of sulphur dioxide upon heating of the solution.

In the removal of sulphur dioxide from waste gases, the problem of the oxidation of the dissolved sulphite must be considered. This may be represented as follows:

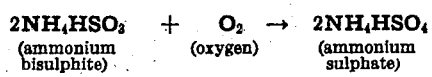
$$2NH_4HSO_3 \;+\; O_2 \;\rightarrow\; 2NH_4HSO_4$$
(ammonium bisulphite)    (oxygen)    (ammonium sulphate)

which forms the corresponding sulphate. This formation of the sulphate results in fixing the sulphur dioxide in the solution so that it cannot be removed by the desired process of heating. Further, an equivalent amount of the ammonia is thereby rendered useless. In the case of the salts described an equivalent amount of the salt is rendered useless, since the acid is incapable of regenerating the salt from a sulphate at the higher temperatures used. It is therefore advantageous, in carrying out this process in connection with gases containing oxygen, to prevent the absorption of the oxygen, as far as possible, into the solution and, secondly, to prevent the reaction of the dissolved oxygen. The first may be accomplished to a large extent by choosing the correct type of absorber to be used, since I have found that the rate of oxygen absorption is dependent upon the manner in which the solution is brought into contact with the gases. For example, this rate of oxygen absorption appears to be lowest when sprays are used. As another means of preventing oxidation certain compounds, known as inhibitors, may be used to inhibit the reaction of the dissolved oxygen with the sulphite. Examples of these inhibitors are phenolic compounds, such as phenol, hydroquinone, resorcinol, or alcohols, or certain metallic compounds. Other materials of the same general classification may be employed.

Also, in order to counteract the loss of ammonia by any oxidation of the sulphite, more ammonia may be added, or a strong alkali, such as sodium hydroxide, may be added to react with the sulphate and restore the ammonia to the solution as ammonium hydroxide or the like.

I have also found that the loss of ammonia by oxidation of the sulphite can be counteracted by the use of calcium carbonate or calcium hydroxide, which is added to the solution, and results in the precipitation of calcium sulphate from the solution, resulting in complete removal of the salt. This precipitation of the sulphate is accomplished in an acid solution produced by passing a gas containing a portion of the recovered sulphur dioxide back into the solution in order to increase the acidity thereof. I have found it necessary to maintain a 5 per cent or greater concentration of sulphur dioxide in the gas in order to produce the desired acidity in the solution. While a smaller concentration of gas may be used, for practical purposes it is desirable to use as high a concentration as is feasible. By maintaining such a concentration, the precipitation of calcium sulphite is prevented, and the precipitation of calcium sulphate is produced. The calcium sulphate may then be removed in any desired manner. I have also found that barium carbonate may be used for this purpose, and in this case it is not necessary to maintain any required concentration of sulphur dioxide in the gas, since the precipitation of barium sulphate is produced irrespective of the concentration of the sulphur dioxide.

It is therefore apparent that I have provided a process which may employ firstly, the use of an aqueous solution containing the salt of an acid having ionizing characteristics such that its ionization constant either increases with increase in temperature, or decreases to a slighter extent than the ionization constant of sulphurous acid; secondly, the use of ammonium sulphite, which possesses the property of absorbing large quantities of sulphur dioxide at low temperature and releasing the sulphur dioxide at higher temperatures, which may be used either alone or in combination with the aqueous solution set forth above, for assisting in increasing the operating capacity of the aqueous solution.

It is to be understood that various changes and modifications may be made, both in the substances used in the process and in the manner of carrying out the process, without departing from the scope and spirit of the invention. Further, other materials having the characteristics of the materials set forth in connection with the process disclosed in the present application may be used without departing from the invention.

I do not intend, therefore, to be limited to the exact substances described, nor to the particular method of carrying out my process which has been disclosed, but only insofar as defined by the appended claims.

I claim:

1. The process of removing and recovering sulphur dioxide from waste gases, which comprises washing said gases to absorb sulphur dioxide by a cooled aqueous solution containing the salt of an organic acid whose ionization constant is such that the ratio of the ionization constant of sulphurous acid to the ionization constant of the said acid decreases with increases in temperature, maintaining said solution cool during said absorption to maintain said ratio high, adding a phenol to said solution to prevent oxidation of the dissolved sulphite ion, and heating said solution to decrease said ratio and liberate sulphur dioxide, the solubility of sulphur dioxide in said solution being directly proportional to said ratio.

2. The process of removing and recovering sulphur dioxide from waste gases, which comprises washing said gases to absorb sulphur dioxide from said gases by an aqueous solution of a salt of sulphanilic acid, and heating said solution to liberate the absorbed sulphur dioxide.

3. The process of removing and recovering sulphur dioxide from waste gases, which comprises washing said gases with a cooled aqueous solution of a salt of sulphanilic acid and an ammonium salt, and heating said solution to liberate the absorbed sulphur dioxide.

4. The process of removing and recovering sulphur dioxide from waste gases, which comprises washing said gases with a cooled aqueous solution of a salt of sulphanilic acid, ammonium sulphite, and an oxidation inhibitor, and heating said solution to liberate the absorbed sulphur dioxide.

5. The process of removing and recovering sulphur dioxide from waste gases, which comprises washing said gases to absorb sulphur dioxide by an aqueous solution of a salt of sulphanilic acid and ammonium sulphite, maintaining said solution cool to retard the influence of said sulphanilic acid and to increase the influence of said ammonium sulphite, and heating said solution to minimize the influence of said ammonium sulphite and to increase the influence of said sulphanilic acid to liberate the absorbed sulphur dioxide.

6. The process of removing and recovering sulphur dioxide from waste gases, which comprises washing said gases to absorb sulphur dioxide by a cooled aqueous solution containing the salt of an organic acid characterized in that the ratio of the ionization constant of sulphurous acid to the ionization constant of the said acid varies inversely with the temperature within the temperature range employed, said acid being insoluble at the temperature of approximately 35° C. as used in the washing process, adding an oxidation inhibitor to said solution to inhibit the oxidation of the dissolved sulphite ion, and heating thereafter said solution approximately to the boiling point to liberate the absorbed sulphur dioxide.

7. The process of removing and recovering sulphur dioxide from waste gases, which comprises washing said gases with a cooled aqueous solution of the salt of an organic acid to absorb sulphur dioxide into said solution, the acid having low solubility at the washing temperature and being relatively inactive as to absorption of sulphur dioxide during the washing process, adding ammonium sulphite to said solution to increase the solubility of the sulphur dioxide in the solution at low temperatures, adding phenols to the solution to inhibit the oxidation of the sulphite ion, and heating said solution after said washing operation to approximately the boiling point of the solution to increase the solubility of said acid and thereby increase the rate of liberation of the absorbed sulphur dioxide.

8. The process of removing and recovering sulphur dioxide from waste gases which comprises washing said gases to absorb sulphur dioxide by a cooled aqueous solution containing the salt of an organic acid characterized in that the ratio of the ionization constant of sulphurous acid to the ionization constant of the said acid varies inversely with the temperature, acidifying said solution with sulphur dioxide to a point above that at which calcium sulphite is precipitated, adding calcium carbonate to the acidified solution to precipitate calcium sulphate, removing said precipitate, heating said solution to liberate the absorbed sulphur dioxide, and returning the solution for further washing of waste gases.

9. The process of removing and recovering sulphur dioxide from waste gases which comprises washing said gases to absorb sulphur dioxide by a cooled aqueous solution containing the salt of an organic acid characterized in that the ratio of the ionization constant of sulphurous acid to the ionization constant of the said acid varies inversely with the temperature, acidifying said solution with sulphur dioxide to a point above that at which calcium sulphite is precipitated, then adding calcium hydroxide to said solution to precipitate calcium sulphate, removing the precipitate, and heating said solution to liberate the absorbed sulphur dioxide.

10. The process of removing and recovering sulphur dioxide from waste gases which comprises washing said gases with an aqueous solution of the salt of an organic acid of low solubility at normal temperatures whose ionization constant increases with respect to the ionization constant of sulphurous acid upon increase in temperature between the washing temperature and the regenerating temperature, maintaining said solution cool to retard the influence of said acid at low temperatures, adding ammonium sulphite to said cooled solution to increase the absorption of sulphur dioxide by said solution and to provide a fine grain precipitation of said acid, and heating said solution to dissolve said acid and to minimize the influence of said ammonium sulphite whereby liberation of said sulphur dioxide is effected.

11. The process of removing and recovering sulphur dioxide from waste gases within a temperature range of approximately 30° C. to 100° C. which comprises washing said gases with an aqueous solution containing the salt of an organic acid whose ionization constant is such that the ratio of the ionization constant of sulphurous acid thereto varies inversely with the temperature within the temperature range employed in said process, maintaining said solution at a relatively low temperature in the lower portion of said range during said washing process to prevent said acid from substantially influencing the absorption of sulphur dioxide into said solution, and thereafter heating said solution to approximately 90° C. to increase the ionization of said acid to thereby increase the liberation of said sulphur dioxide.

12. The process of removing and recovering sulphur dioxide from waste gases which comprises washing said gases at a temperature of approximately 35° C. with a cooled aqueous solution of the salt of an organic acid whose ionization constant is such that the ratio of the ionization constant of sulphurous acid with respect thereto varies inversely with temperature increase from 35° to 100° C., and thereafter heating said solution to approximately 100° C. to liberate the absorbed sulphur dioxide.

13. The process of removing and recovering sulphur dioxide from waste gases containing as low as 0.05% by volume of sulphur dioxide which comprises forming an aqueous solution of the salt of an organic acid having the characteristic of being substantially insoluble at low temperatures and increasing its solubility with increases in temperature, washing said gases with a relatively cool solution of said salt to absorb sulphur dioxide from said gases, maintaining said solution at a temperature such that said acid is substantially insoluble and unionized during the washing operation, and thereafter heating said solution to approximately the boiling point to increase the solubility and ionization of said acid to thereby increase the rate of liberation of the absorbed sulphur dioxide from said solution.

14. In the process of removing and recovering sulphur dioxide from waste gases containing the same in which the gases are washed by an absorbing solution at a temperature of approximately 35° C. and the solution is thereafter heated to approximately the boiling point to liberate the absorbed sulphur dioxide, the novel procedure which consists in forming an aqueous solution containing the salt of an organic acid characterized in that the ratio of the ionization constant of sulphurous acid to the ionization constant of the said acid varies inversely with the temperature within the temperature range employed in said process, adding an oxidation inhibitor to said solution to inhibit the oxidation of the dissolved sulphite ion. washing said waste gases with said solution at the said washing temperature, and thereafter heating said solution to approximately liberating temperature.

15. In the process of removing and recovering sulphur dioxide from waste gases which comprises washing the gases to absorb sulphur dioxide therefrom by a cooled aqueous solution containing the salt of an organic acid characterized in that the ratio of the ionization constant of sulphurous acid to the ionization constant of the said acid varies inversely with the temperature, and the solution is thereafter heated to liberate the absorbed sulphur dioxide, the novel procedure which comprises acidifying a portion of the solution before liberation of the absorbed sulphur dioxide by passing a portion of the recovered sulphur dioxide thereinto to increase the acidity of said portion of the solution to a point above that at which calcium sulphite is precipitated, and then adding a soluble calcium salt to said portion of said solution to precipitate calcium sulphate therefrom.

16. The process of removing and recovering sulphur dioxide from waste gases which comprises washing said gases to absorb sulphur dioxide by a cooled aqueous solution containing the salt of an organic acid characterized in that said acid increases in acidity with heating, acidifying a portion of the said solution after washing with sulphur dioxide to a point above that at which calcium sulphite can precipitate, adding calcium ions in amount sufficient to said portion of said solution for interaction with the sulphate ions therein to precipitate calcium sulphate, removing said precipitate, then combining said portion of said solution with the remaining untreated solution, heating the entire solution to liberate the absorbed sulphur dioxide, and thereafter cooling and returning said solution for further washing of waste gases.

17. The process of removing and recovering sulphur dioxide from waste gases which comprises washing said gases to absorb sulphur dioxide by a cooled aqueous solution of a salt of an organic acid whose acidity increases with temperature increases from substantially 35° C. to 100° C., said acid being substantially inactive in the solution at the lower temperature, and thereafter heating said solution to approximately the boiling point to increase the acidity of said solution and thereby increase the rate of liberation of the absorbed sulphur dioxide.

18. In the process of removing and recovering sulphur dioxide from waste gases containing the same, in which the gases are contacted with a cooled aqueous solution containing sulphite ions to absorb sulphur dioxide from said gases, the novel procedure which comprises acidifying a portion of the saturated solution after contact with said gases by passing a portion of the recovered sulphur dioxide thereinto to increase the acidity of said portion of said solution to a point above that at which calcium sulphite is precipitated, then adding calcium ions to said portion of said solution in amount sufficient to precipitate calcium sulphate, removing said precipitate, and returning said treated portion of said solution to the main body of said solution for liberation of the absorbed sulphur dioxide therein.

HENRY F. JOHNSTONE.